United States Patent [19]

Wilby

[11] 4,121,787

[45] Oct. 24, 1978

[54] AIRCRAFT

[75] Inventor: Peter Glover Wilby, Weybridge, England

[73] Assignee: The Secretary of State for Defence in Her Britannic Majesty's Government of the United Kingdom of Great Britain and Northern Ireland, England

[21] Appl. No.: 700,956

[22] Filed: Jun. 29, 1976

[30] Foreign Application Priority Data

Jun. 12, 1975 [GB] United Kingdom ............... 25272/75

[51] Int. Cl.² .............................................. B64C 3/26
[52] U.S. Cl. .................................... 244/35 R; 244/200
[58] Field of Search ................ 244/35 R, 35 A, 34 R, 244/13, 15, 40 R, 41, 199, 200, 198

[56] References Cited

U.S. PATENT DOCUMENTS

| 1,571,989 | 2/1926 | Zimmermann | 244/35 R |
|---|---|---|---|
| 1,752,378 | 4/1930 | Gobble | 244/35 R |
| 2,426,334 | 8/1947 | Banning, Jr. | 244/200 |
| 3,463,418 | 8/1969 | Miksch | 244/199 |
| 3,952,971 | 4/1976 | Whitcomb | 244/35 R |

OTHER PUBLICATIONS

Abbott et al., *Theory of Wing Sections*, p. 371 NACA 65₂A015 Airfoil Section, 1959.

Primary Examiner—Galen L. Barefoot
Attorney, Agent, or Firm—Cameron, Kerkam, Sutton, Stowell & Stowell

[57] ABSTRACT

A supercritical wing section having a large average leading edge radius of curvature, followed on the upper surface by a reduction in curvature and then a knee, or region of positively increased curvature, at between 3% and 13%, preferably 5% to 10%, chord the region of increased curvature being followed by a region of low curvature extending for 30% to 90% of the chord, whereby in use of the wing at low speeds the peak velocity and peak suction are contained, in use thereof at intermediate speeds local supersonic expansion is minimized, and in use thereof in supercritical conditions a region of high expansion, stabilized over the region of increased curvature, is created.

3 Claims, 38 Drawing Figures

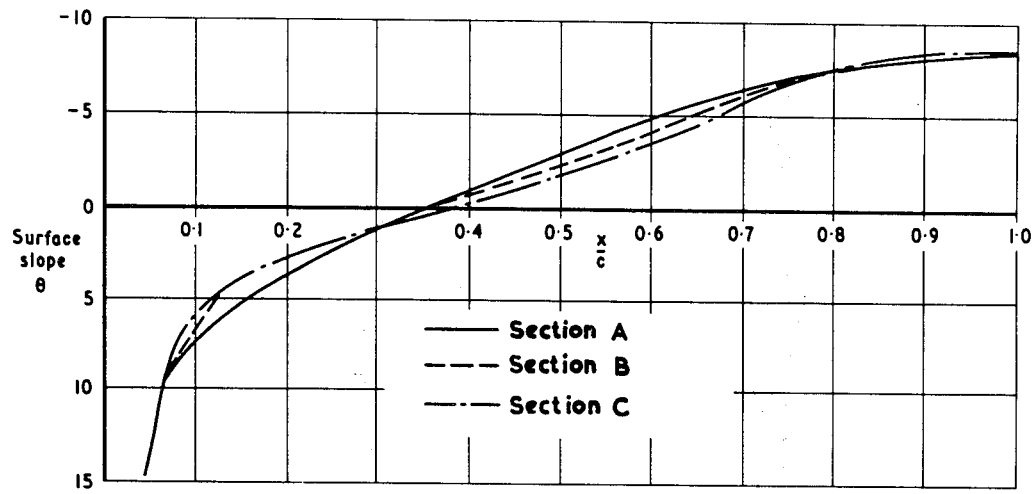
Fig. 3.
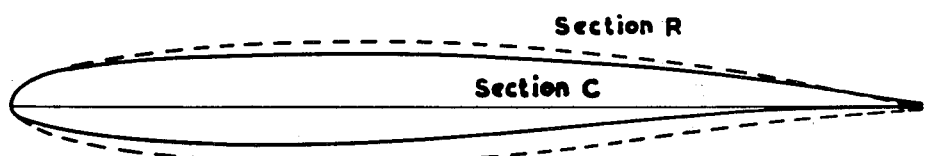
Fig. 4. Comparison of profiles for Section C and Section R

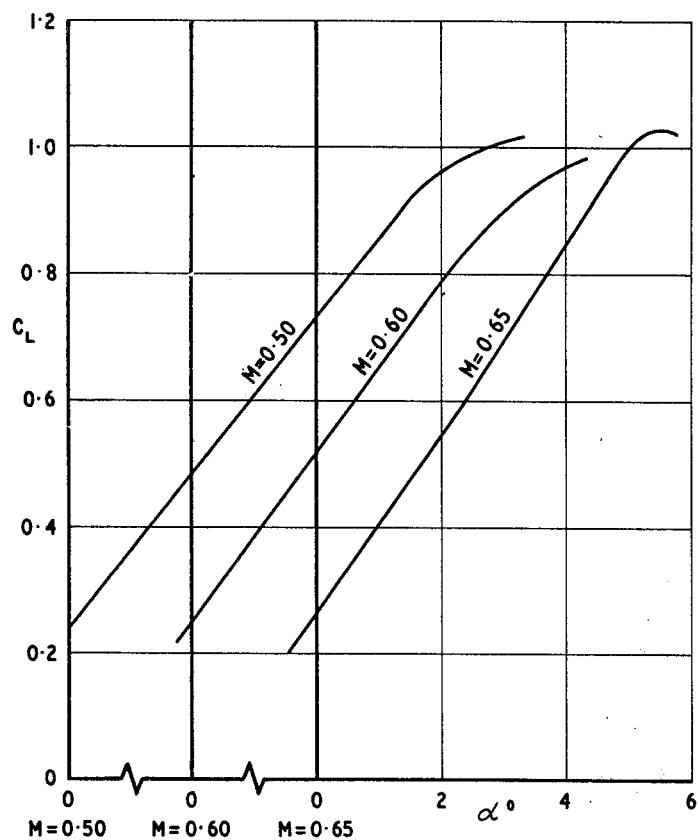
Fig. 5. Measured values of lift coefficient for Section C

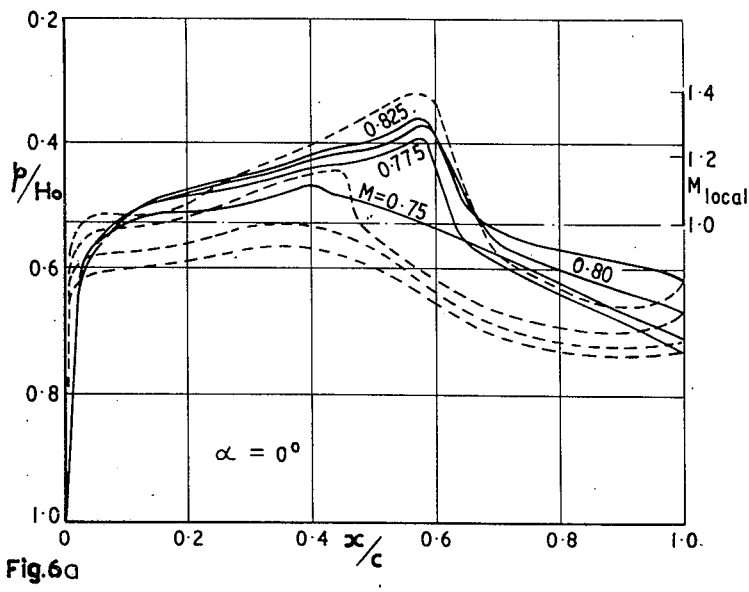
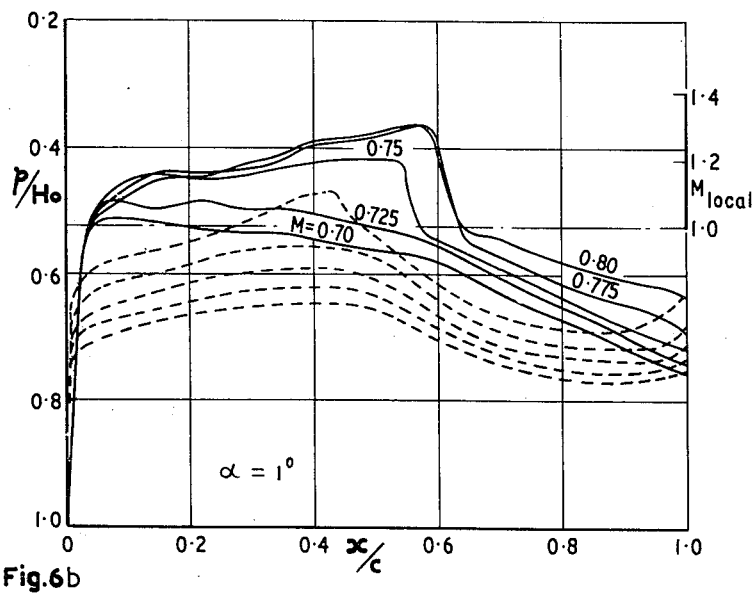
Fig. 6a & b Experimental pressure distributions for Section R

Figure 6C:
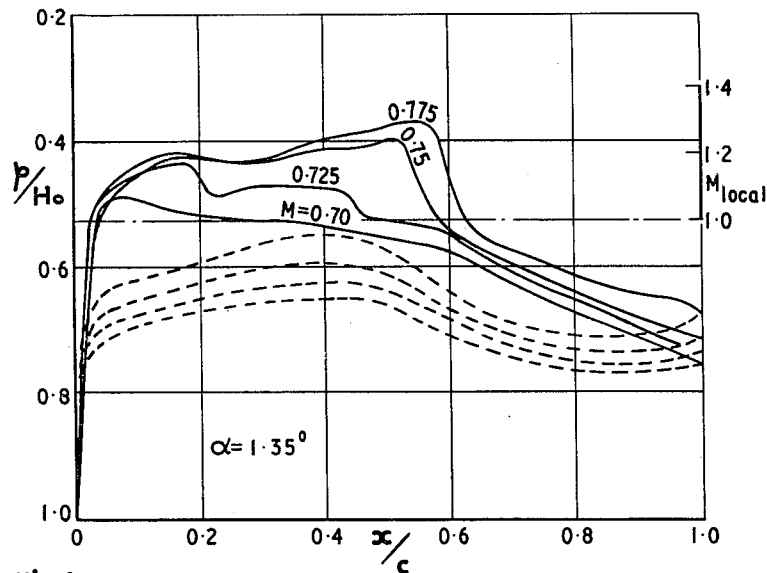
Figure 6D:
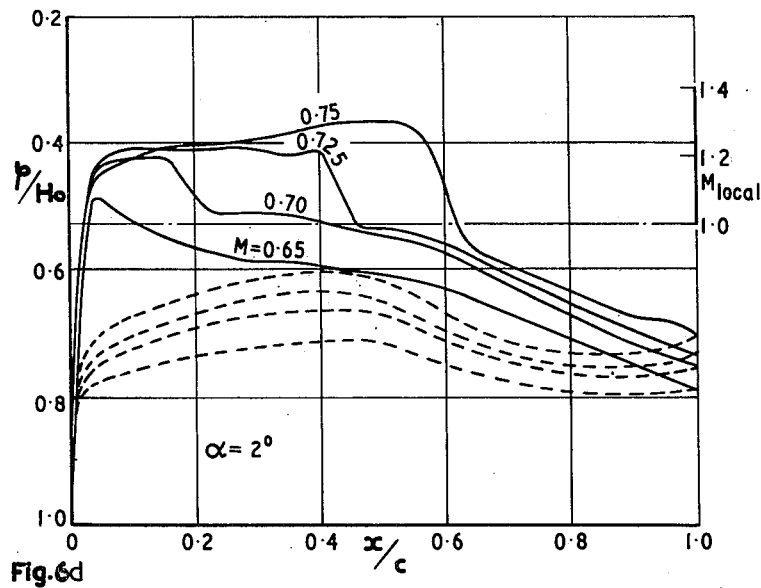

Fig. 6c & d Experimental pressure distributions for Section R

Figure 6E:
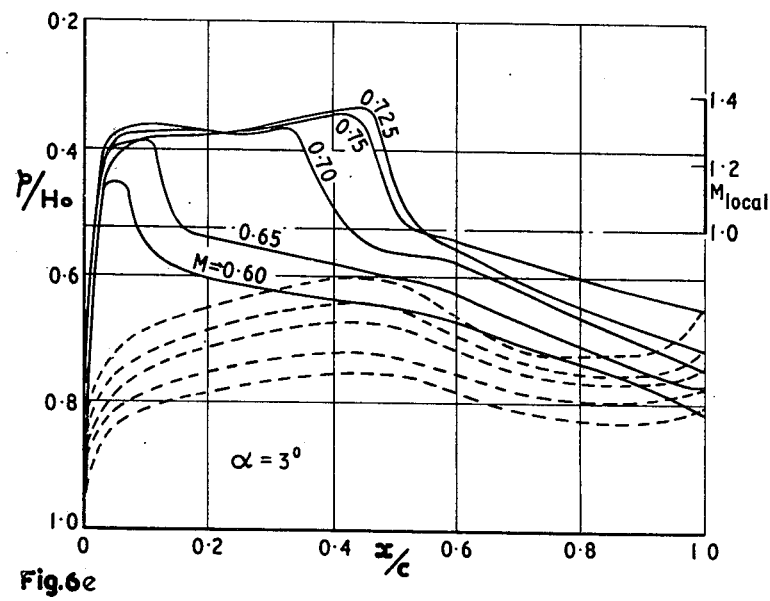
Figure 6F:
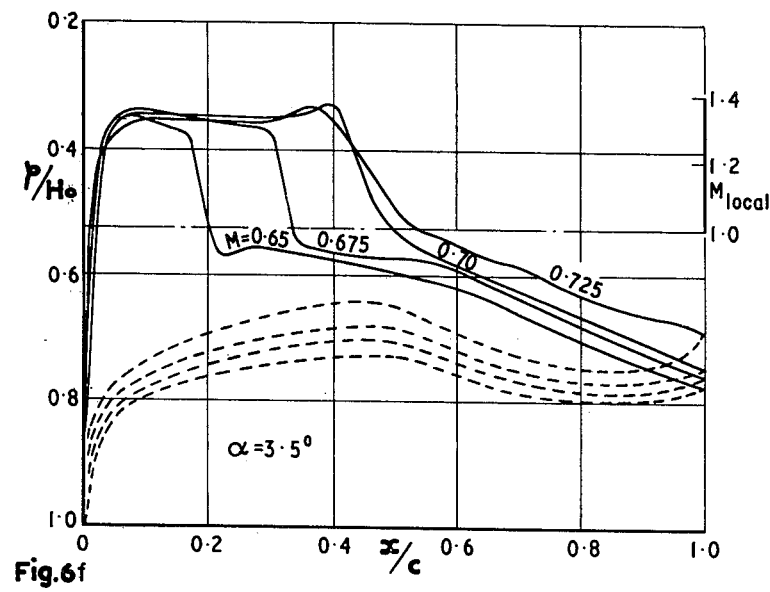

Fig. 6e & f Experimental pressure distributions for Section R

Figure 6G:
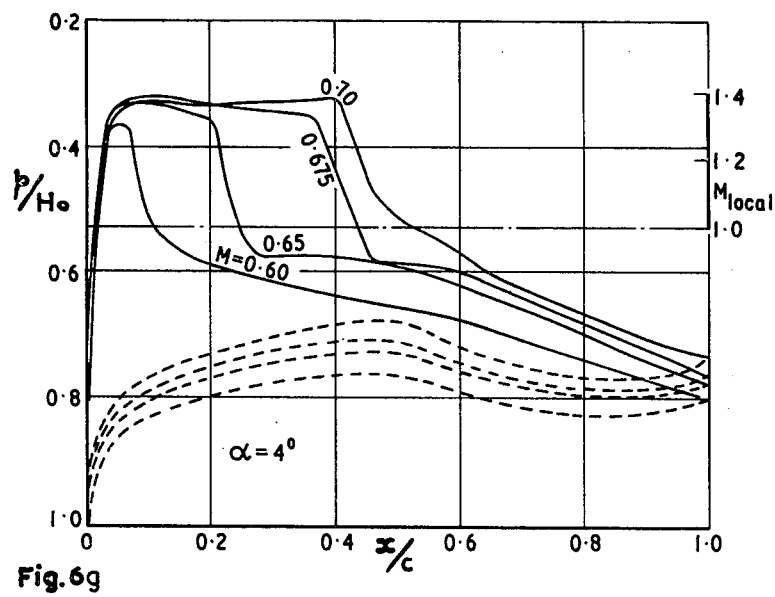
Figure 6H:
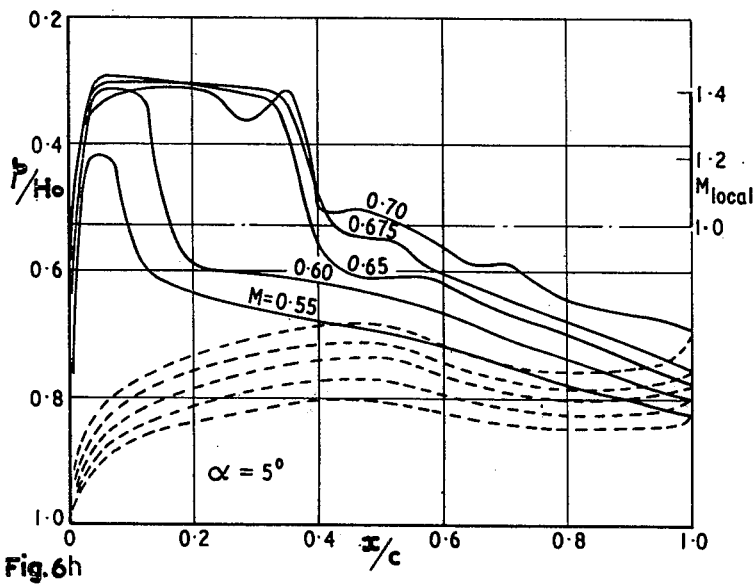

Fig. 6g & h Experimental pressure distributions for Section R

Figure 7A:
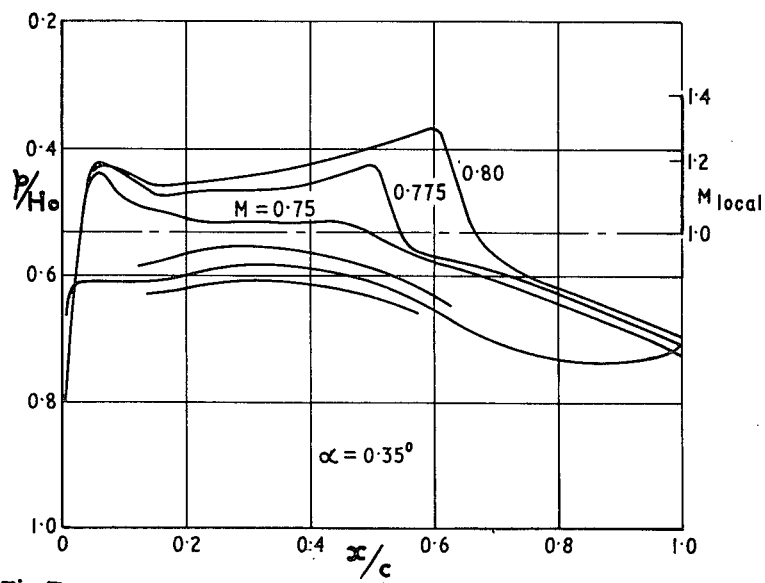

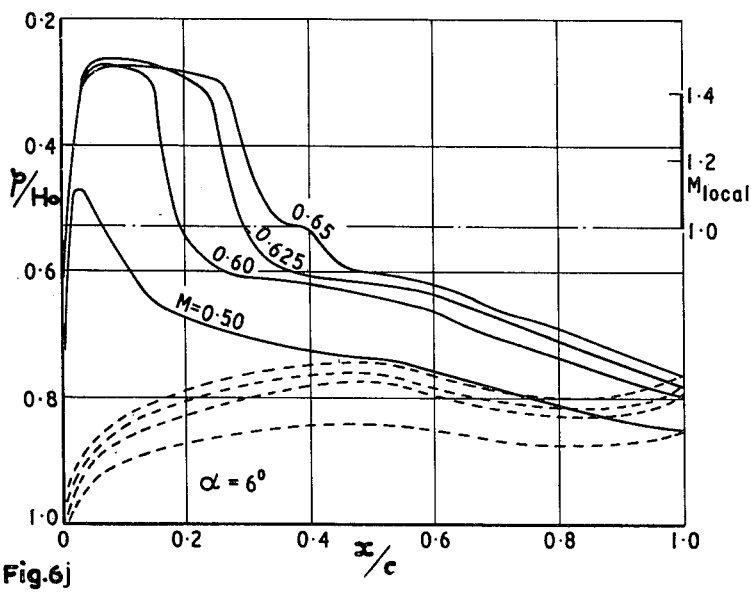
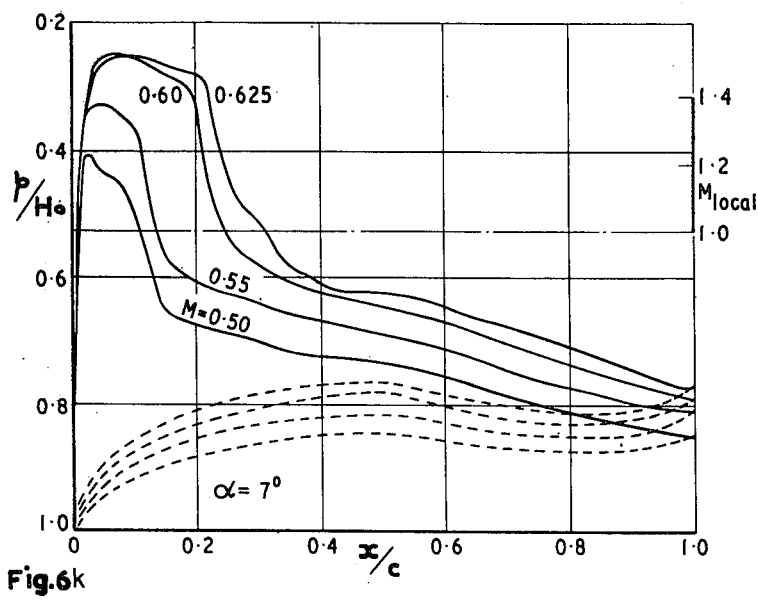
Fig. 6j & k Experimental pressure distributions for Section R Fig. 7a & b  Experimental pressure distributions for Section A

Experimental pressure distributions for Section A

Experimental pressure distributions for Section B

Figure 8C:
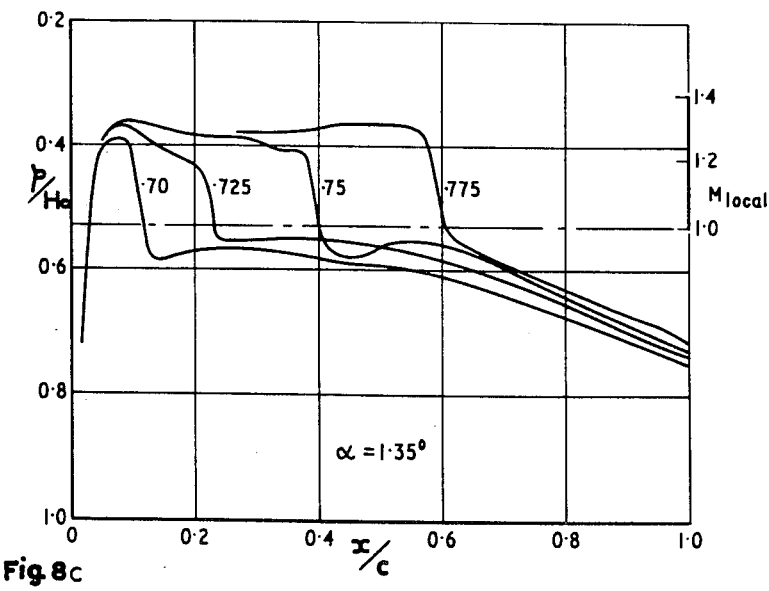
Figure 8A:
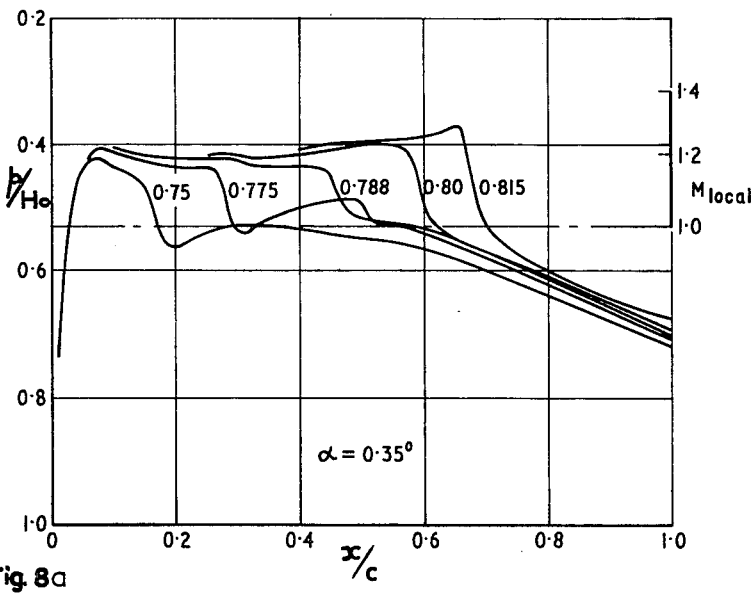
Figure 8B:
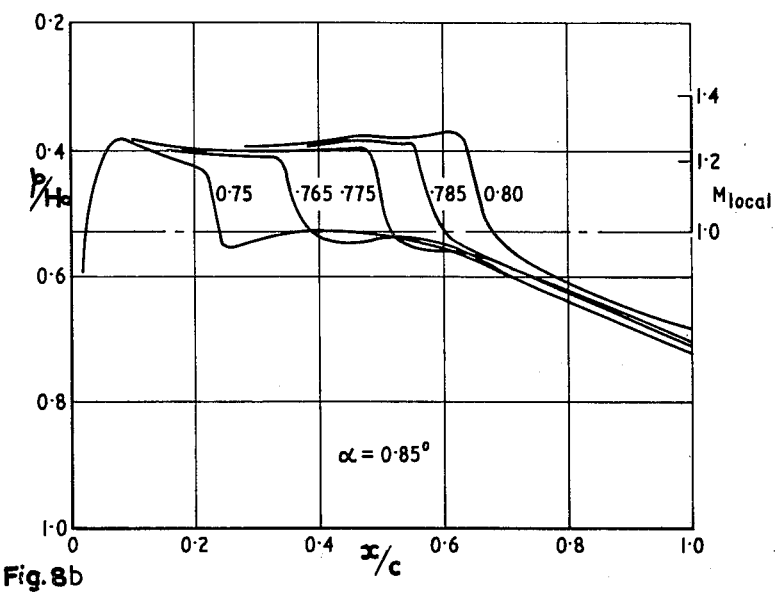

Fig. 8a & b  Experimental pressure distributions for Section B

Figure 9A:
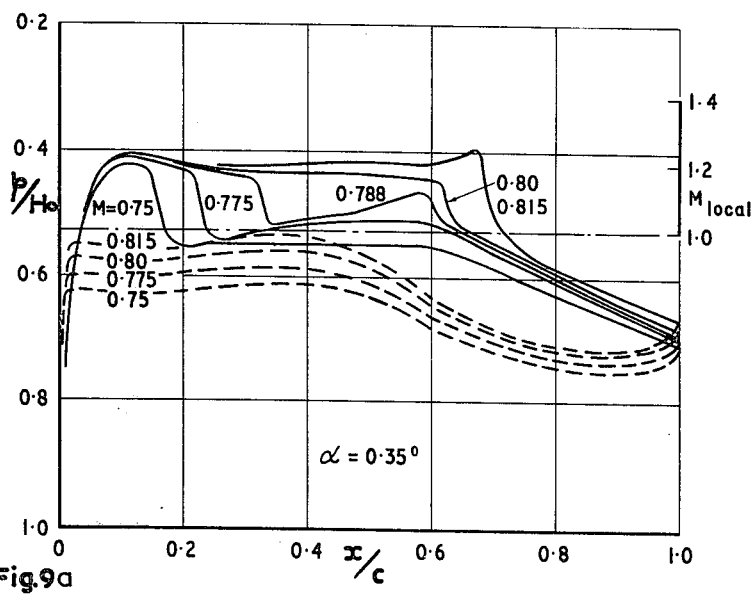

Fig. 9a & b Experimental pressure distributions for Section C

Figure 9B:
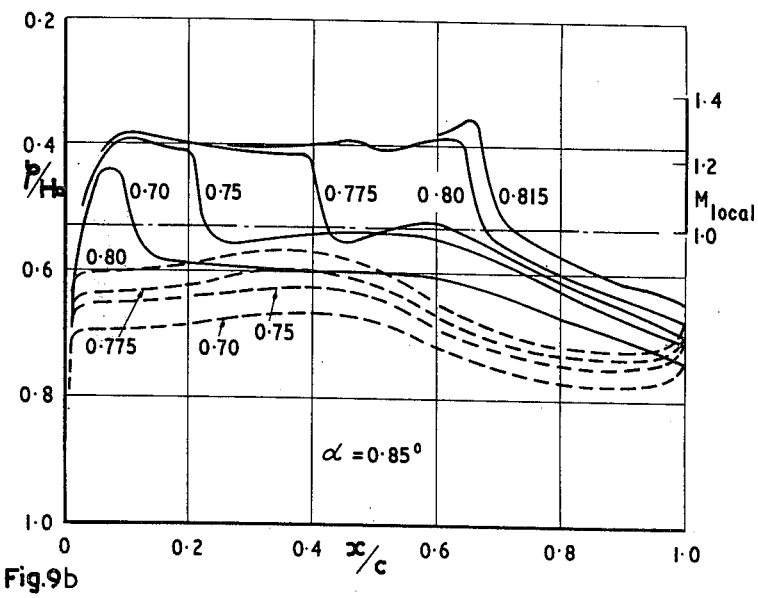

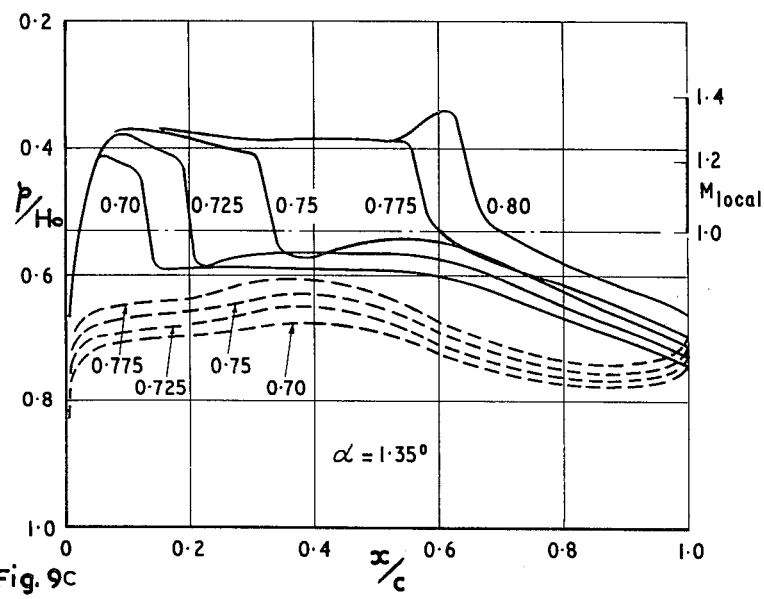
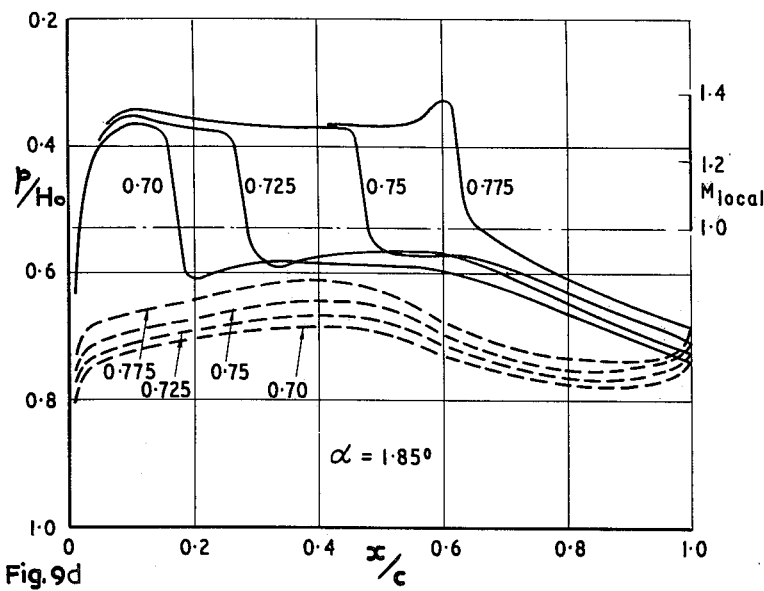
Fig. 9 c & d  Experimental pressure distributions for Section C

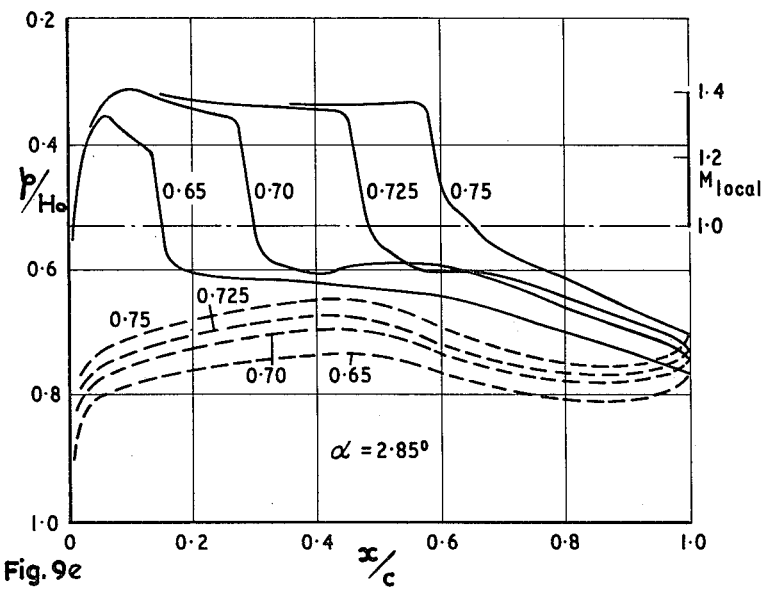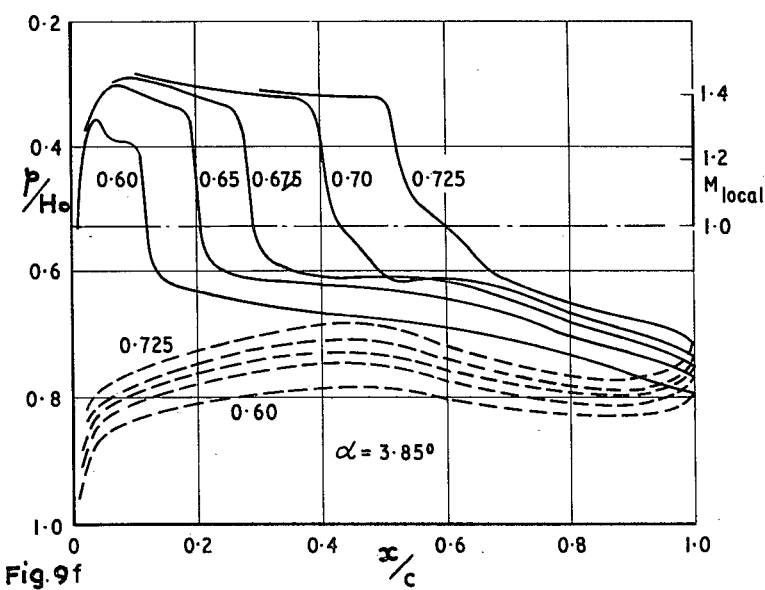
Fig.9e & f. Experimental pressure distributions for Section C

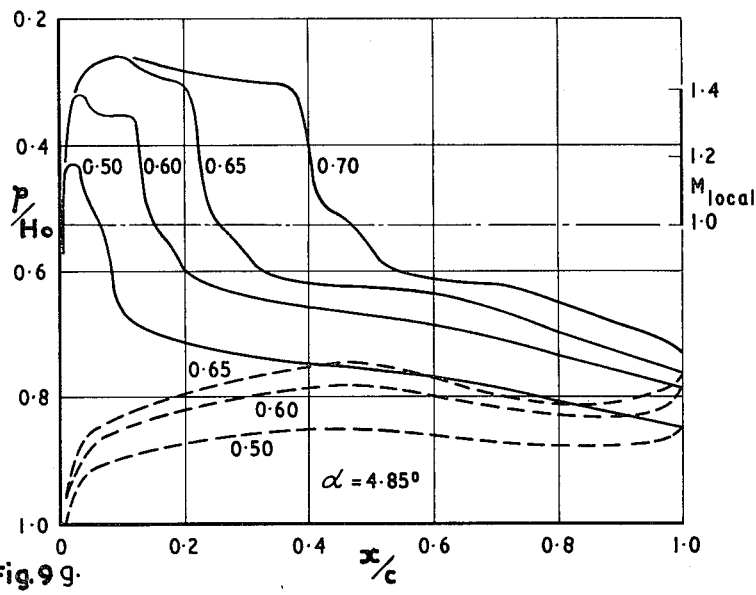
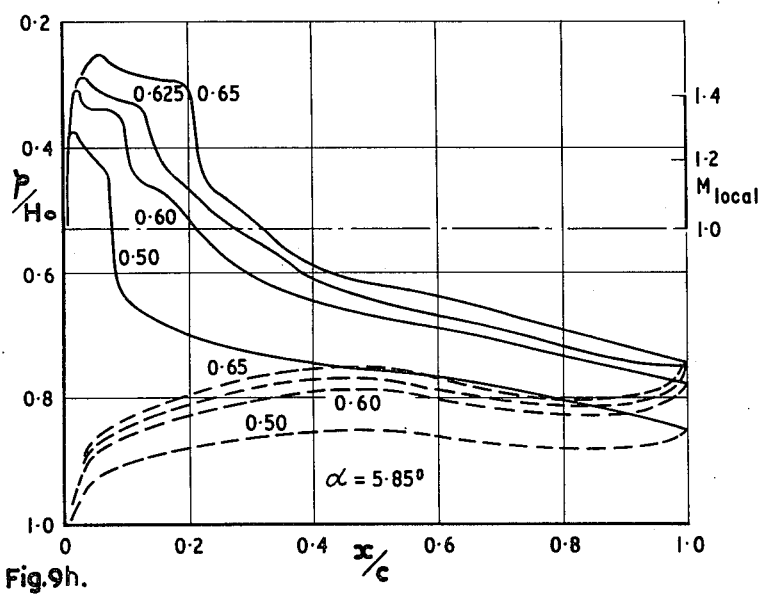
Fig. 9 g & h Experimental pressure distributions for Section C.

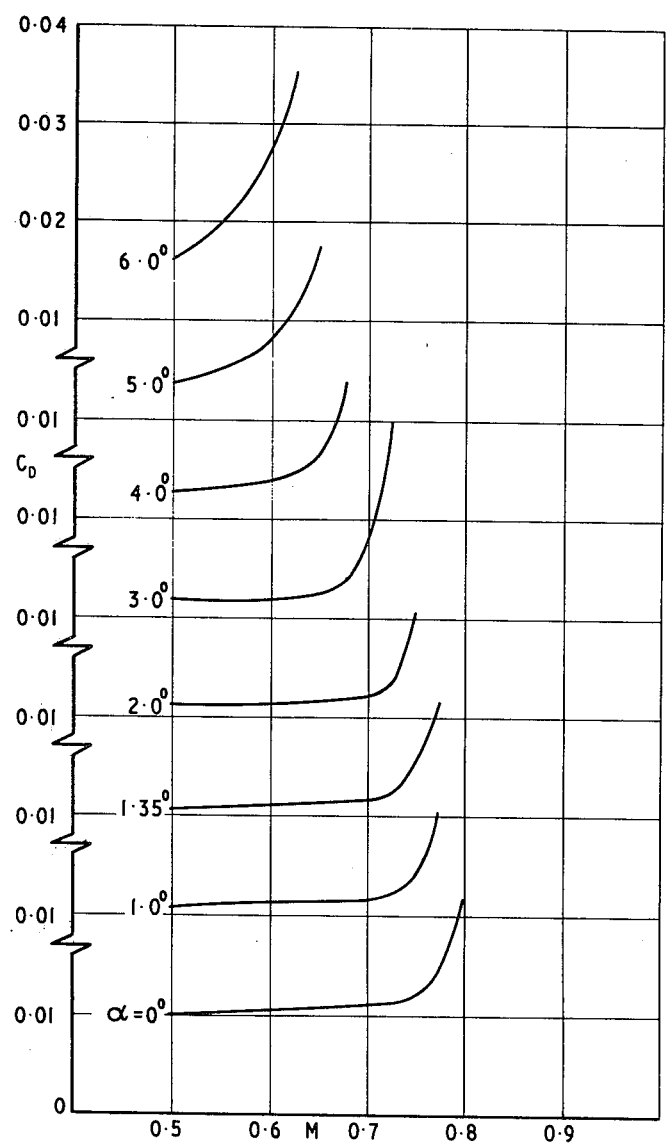
Fig. 10. Measured values of drag coefficient for Section R.

Measured values of lift coefficient for Section R.

Conditions of comparable drag and Mach number margin for Section C and Section R.

Measured values of pitching moment coefficient for Section R.

Measured values of pitching moment coefficient for section C.

Fig. 17

AEROFOIL ORDINATES.

| X/c | Section R | | Section A | Section B | Section C | Section A.B.C. |
|---|---|---|---|---|---|---|
| | Zu/c | Zl/c | Zu/c | Zu/c | Zu/c | Zl/c |
| 0. | 0. | 0. | 0. | 0. | 0. | 0. |
| 0.00050 | 0.00424 | −0.00347 | 0.00522 | 0.00522 | 0.00522 | −0.00410 |
| 0.00100 | 0.00603 | −0.00482 | 0.00732 | 0.00732 | 0.00732 | −0.00545 |
| 0.00160 | 0.00765 | −0.00599 | 0.00925 | 0.00925 | 0.00925 | −0.00665 |
| 0.00241 | 0.00943 | −0.00723 | 0.01128 | 0.01128 | 0.01128 | −0.00785 |
| 0.00350 | 0.01142 | −0.00855 | 0.01343 | 0.01343 | 0.01343 | −0.00900 |
| 0.00500 | 0.01371 | −0.01001 | 0.01580 | 0.01580 | 0.01580 | −0.01030 |
| 0.00650 | 0.01567 | −0.01121 | 0.01778 | 0.01778 | 0.01778 | −0.01139 |
| 0.00800 | 0.01743 | −0.01224 | 0.01940 | 0.01940 | 0.01940 | −0.01228 |
| 0.00961 | 0.01914 | −0.01322 | 0.02090 | 0.02090 | 0.02090 | −0.01316 |
| 0.01500 | 0.02407 | −0.01586 | 0.02480 | 0.02480 | 0.02480 | −0.01533 |
| 0.02153 | 0.02877 | −0.01831 | 0.02841 | 0.02841 | 0.02841 | −0.01727 |
| 0.03000 | 0.03341 | −0.02090 | 0.03216 | 0.03216 | 0.03216 | −0.01947 |
| 0.03806 | 0.03689 | −0.02295 | 0.03496 | 0.03496 | 0.03496 | −0.02118 |
| 0.05904 | 0.04325 | −0.02723 | 0.04029 | 0.04029 | 0.04033 | −0.02459 |
| 0.08427 | 0.04904 | −0.03132 | 0.04444 | 0.04434 | 0.04421 | −0.02786 |
| 0.11349 | 0.05427 | −0.03509 | 0.04828 | 0.04776 | 0.04719 | −0.03074 |
| 0.14645 | 0.05900 | −0.03840 | 0.05170 | 0.05045 | 0.04955 | −0.03332 |
| 0.18280 | 0.06309 | −0.04141 | 0.05476 | 0.05276 | 0.05231 | −0.03556 |
| 0.22221 | 0.06647 | −0.04385 | 0.05719 | 0.05480 | 0.05427 | −0.03731 |
| 0.26430 | 0.06918 | −0.04580 | 0.05904 | 0.05640 | 0.05581 | −0.03856 |
| 0.30866 | 0.07114 | −0.04696 | 0.06021 | 0.05744 | 0.05697 | −0.03915 |
| 0.35486 | 0.07231 | −0.04715 | 0.06061 | 0.05778 | 0.05763 | −0.03889 |
| 0.40245 | 0.07261 | −0.04619 | 0.06017 | 0.05742 | 0.05779 | −0.03773 |
| 0.45099 | 0.07207 | −0.04401 | 0.05892 | 0.05642 | 0.05735 | −0.03560 |
| 0.50000 | 0.07051 | −0.04051 | 0.05688 | 0.05478 | 0.05637 | −0.03232 |
| 0.54901 | 0.06791 | −0.03539 | 0.05394 | 0.05234 | 0.05462 | −0.02788 |
| 0.59755 | 0.06424 | −0.02954 | 0.05017 | 0.04917 | 0.05208 | −0.02267 |
| 0.64514 | 0.05948 | −0.02324 | 0.04574 | 0.04524 | 0.04876 | −0.01716 |
| 0.69134 | 0.05402 | −0.01736 | 0.04087 | 0.04071 | 0.04455 | −0.01199 |
| 0.73570 | 0.04815 | −0.01245 | 0.03586 | 0.03586 | 0.03976 | −0.00768 |
| 0.77779 | 0.04202 | −0.00844 | 0.03082 | 0.03082 | 0.03472 | −0.00424 |
| 0.81720 | 0.03579 | −0.00537 | 0.02581 | 0.02581 | 0.02971 | −0.00175 |
| 0.85355 | 0.02976 | −0.00310 | 0.02094 | 0.02094 | 0.02484 | −0.00010 |
| 0.88651 | 0.02403 | −0.00153 | 0.01641 | 0.01641 | 0.02031 | 0.00085 |
| 0.91573 | 0.01863 | −0.00055 | 0.01236 | 0.01236 | 0.01626 | 0.00130 |
| 0.94096 | 0.01336 | −0.00006 | 0.00870 | 0.00870 | 0.01260 | 0.00126 |
| 0.96194 | 0.00861 | 0.00011 | 0.00562 | 0.00562 | 0.00950 | 0.00098 |
| 0.97847 | 0.00465 | 0.00009 | 0.00302 | 0.00302 | 0.00706 | 0.00062 |
| 0.99039 | 0.00197 | 0.00005 | 0.00133 | 0.00133 | 0.00525 | 0.00029 |
| 0.99759 | 0.00047 | 0.00001 | 0.00034 | 0.00034 | 0.00416 | 0.00006 |
| 1.0 | 0 | 0 | 0 | 0 | 0.00380 | 0 |

AIRCRAFT

The present invention relates to aerofoil sections. It is particularly concerned with supercritical sections; that is, sections whereby lift is maximised and drag minimised in the subsonic free stream air speed conditions when local to the wing Mach 1 is exceeded over a substantial proportion of the chord.

Typically a supercritical section is the inverse of the normal wing section, in that the upper surface is flatter than the lower. Unmodified, such a section has, however, poor lifting properties at low speeds, and it is an object of the present invention to provide a supercritical section having good low speed lift and acceptable performance up to the supercritical condition for little cost in terms of performance in supercritical conditions.

According to the present invention a supercritical wing section has a large average leading edge radius of curvature, followed on the upper surface by a reduction in curvature and then at $0.03 < x/c < 0.13$ a region of increased curvature, where $x/c$ = distance along the chord expressed as a fraction of the chord, the region of increased curvature being followed by a region of low curvature extending for 30% to 90% of the chord.

The effect of shapes according to the invention on the performance of the aerofoil is to contain the peak velocity and suction at low speeds, eg. up to a free stream Mach number $(M\infty) = 0.3$, to a minimum and thereby to delay the onset of stall, at intermediate speeds, eg. $M\infty = 0.3$–0.6, to minimise local supersonic expansion and hence the strength of the shock wave on the upper surface forward region, and at high speeds (in supercritical conditions) to create a peak velocity, or region of high expansion, which is stabilised over the region of increased curvature (the knee) and thereby to give a moderate lift coefficient stable over an acceptably wide range. Maximising the slope and minimising the rate of change of slope between the leading edge and the knee tends to optimise the intermediate speed conditions.

The high speeds referred to include the cruising speed for a supercritical wing section, and are typically $0.65 < M\infty < 0.9$. In supercritical wing terminology a large leading edge radius of curvature is from about 1.5% chord to about 3.5% chord, depending on the thickness/chord $(x/c)$ ratio. Thus for a section with a $t/c$ ratio of about 10% a radius of 1.5 to 2.5% chord is large while for a section with a $t/c$ ratio of, say, 14% a radius of 2.5% to 3.5% chord is large.

According to preferred features of the invention the said region of increased curvature, the knee, is positioned at $x/c = 0.05$ to 0.1 and is characterised by a change of slope of approximately 3° over 0.3% chord length.

It is of advantage for the chord-wise extent of supercritical flow to be as large as possible in order to maximise lift. According to another feature of the invention the upper surface has a minimum curvature region, wherein the low curvature is substantially constant, extending for over 30%, preferably 35–60%, of the upper surface. By low curvature is meant one having a radius of the order of 2½ to 5 times the chord length.

Fairing of such a long region of low curvature down to the trailing edge is preferably arranged to avoid a large shock wave and rear end flow separation, particularly to avoid a sudden appearance of such conditions giving rise to a substantial increase in drag, at a Mach number only slightly above cruise conditions. One way of doing this is to incorporate a thick trailing edge of thickness 0.002 to 0.02 chord. On a typical supercritical wing, of course, the lower surface mean curvature is larger than the upper. However, according to yet another feature of the invention a rear part of the lower surface of the section is concave, thus imparting a degree of camber, from which lift can be derived at subcritical speeds, to the rear part of the section. The point of inflexion of the lower surface preferably lies at $0.5 < x/c < 0.7$. Sections having such rear loading are particularly useful on fixed wings. With helicopter rotors there may be an unacceptable pitching moment variation.

Figure 1A:
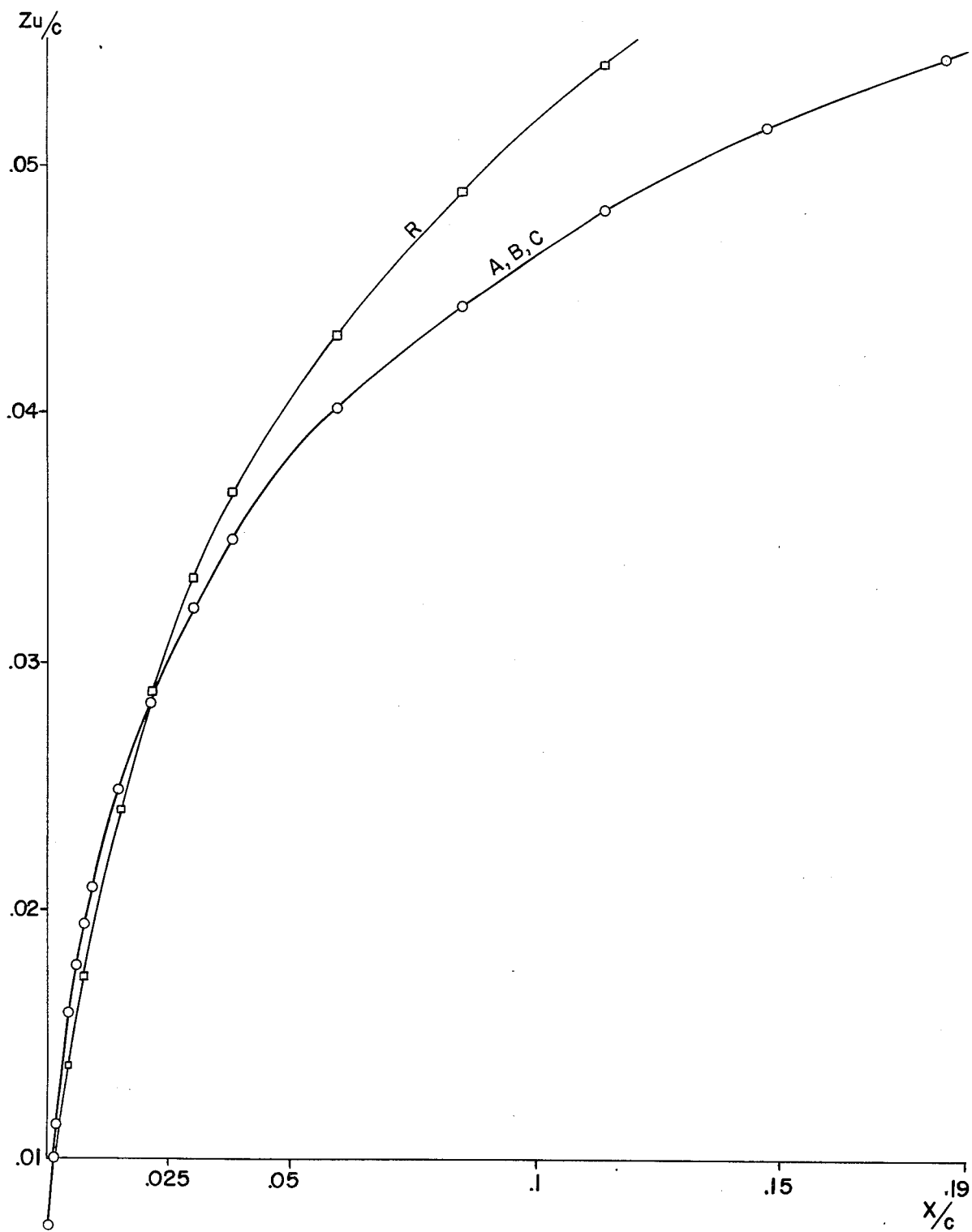
Figure 1B:
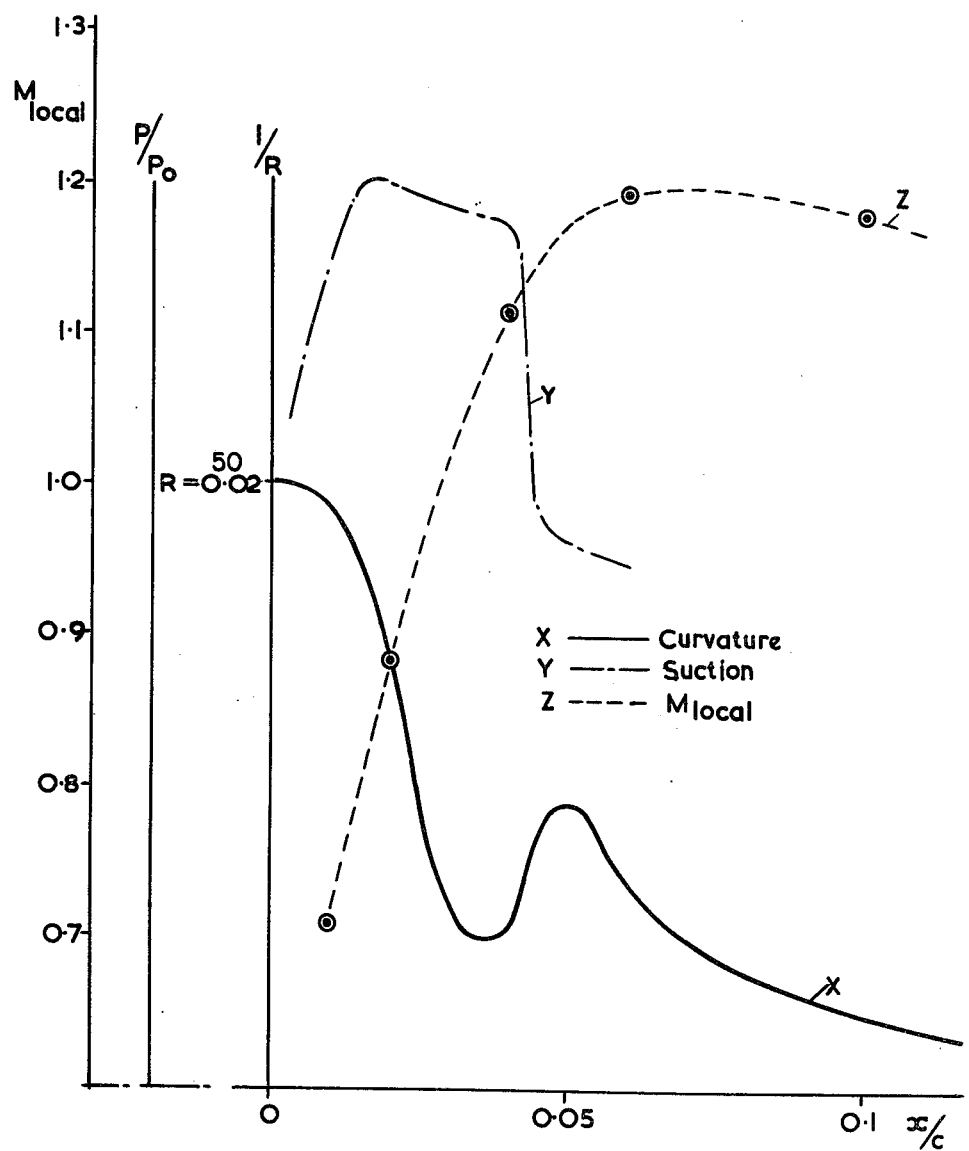
Figure 2:
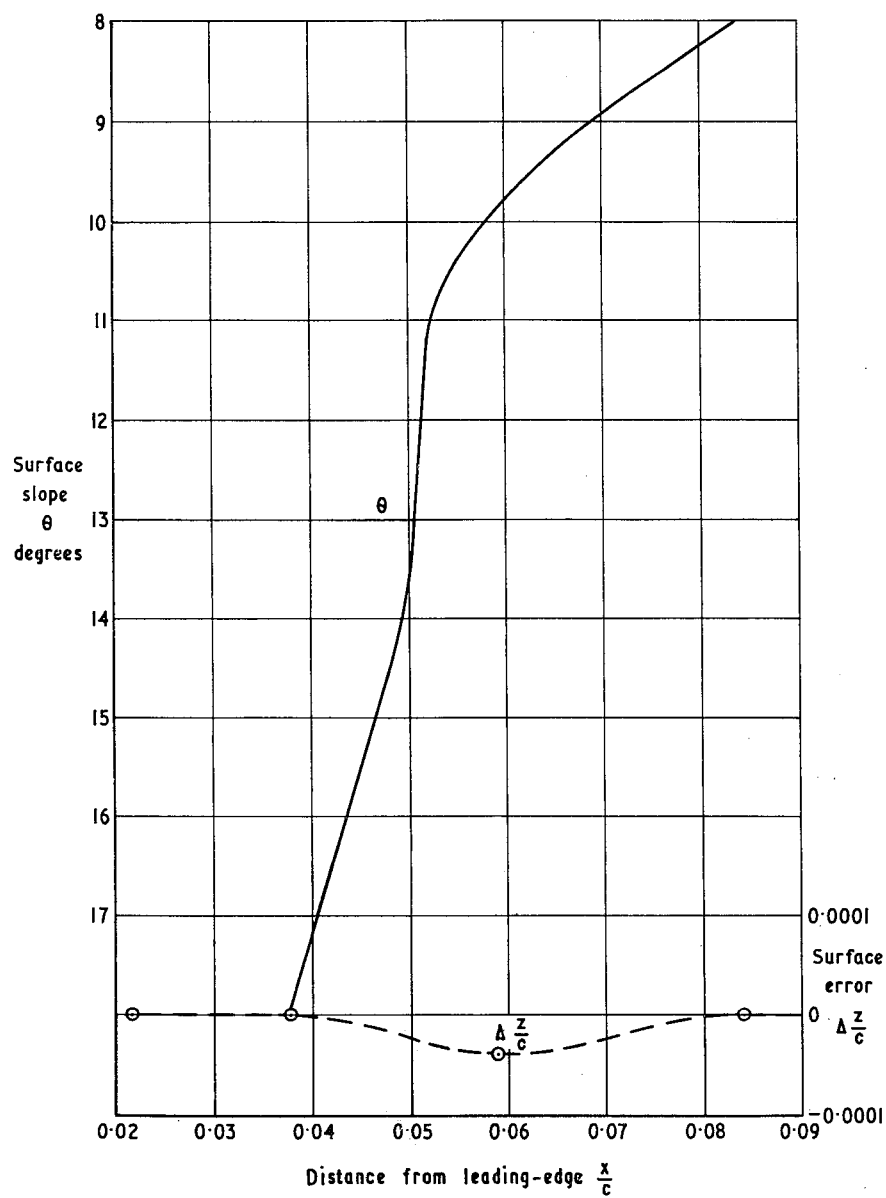
Figure 11:
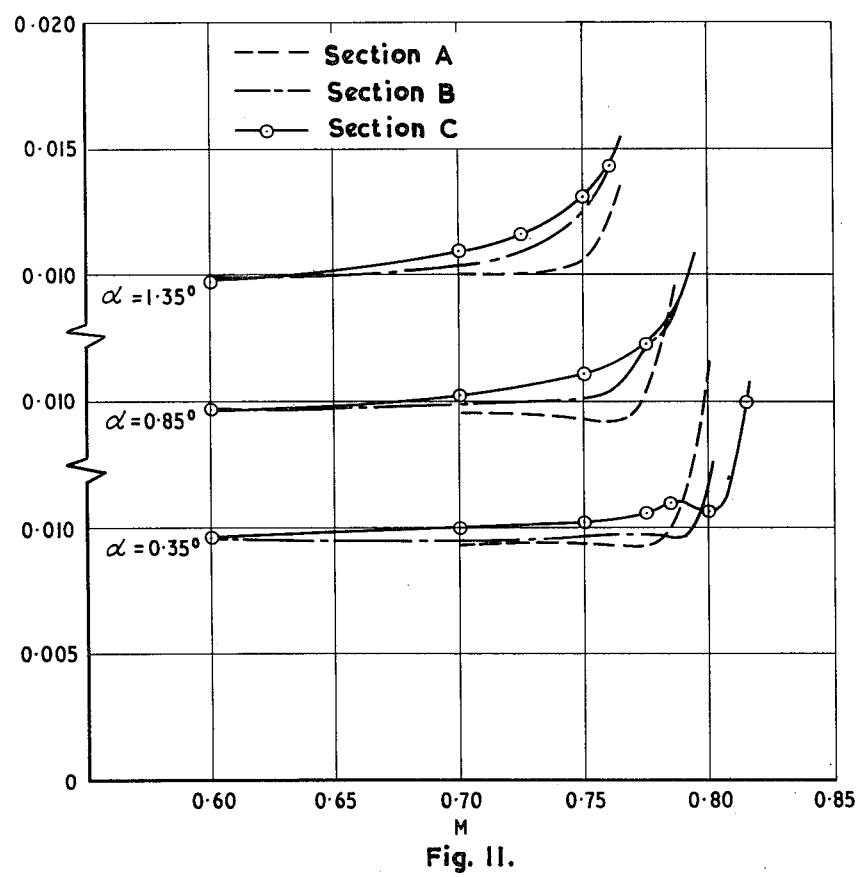
Figure 12:
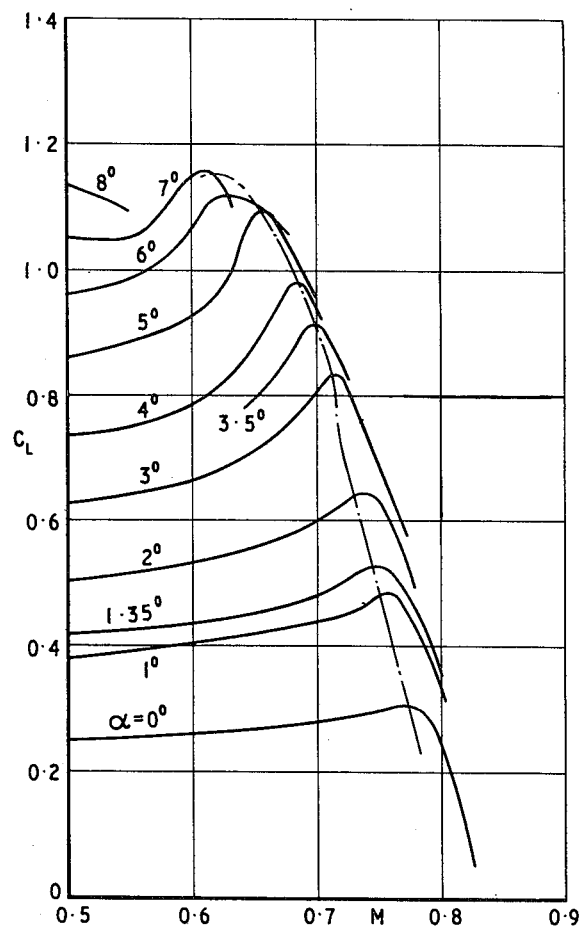
Figure 13:
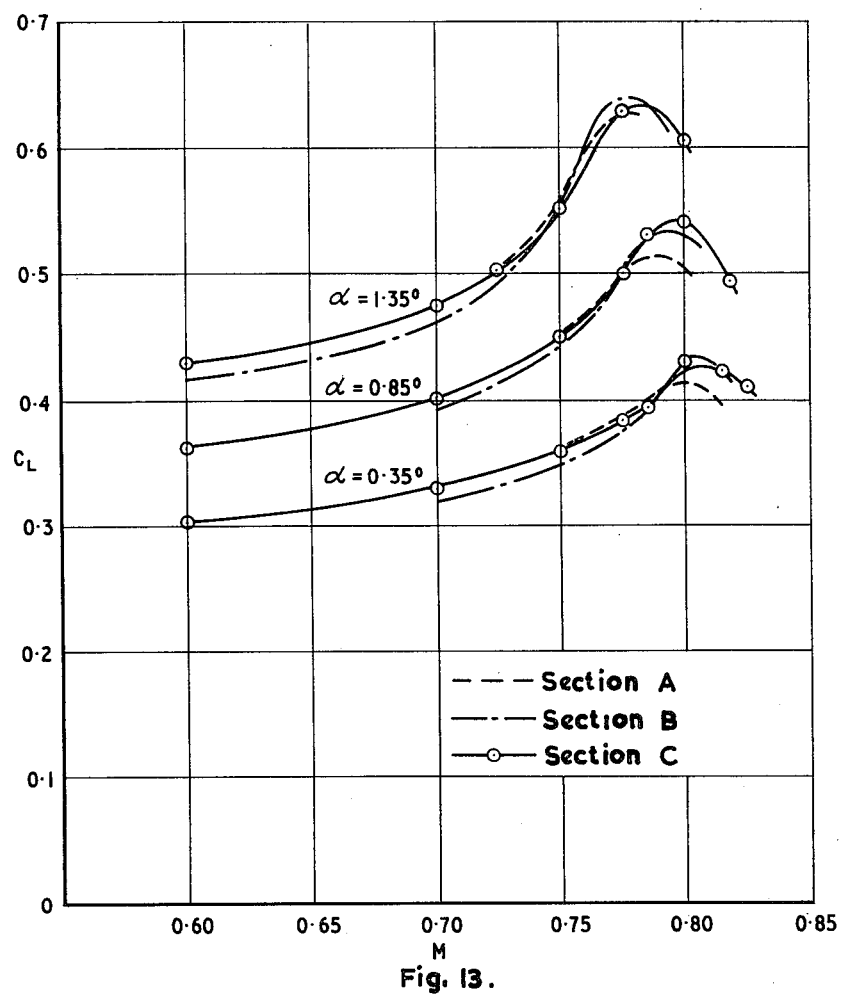
Figure 14:
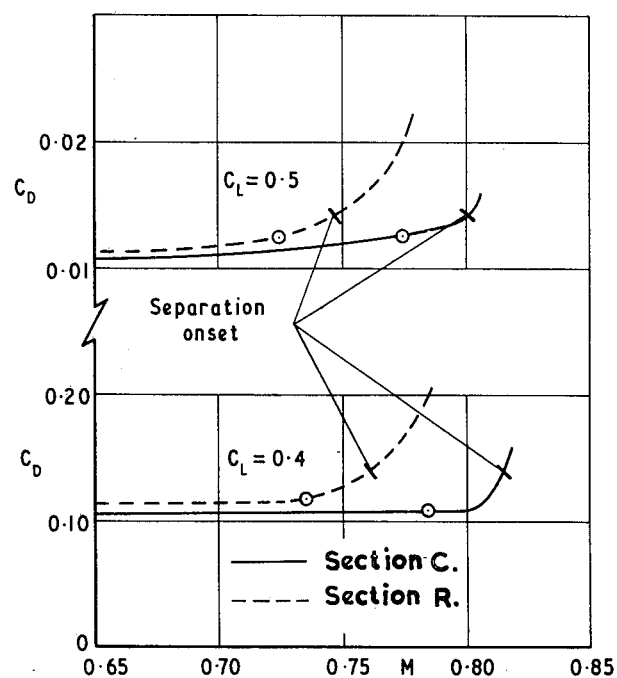
Figure 15:
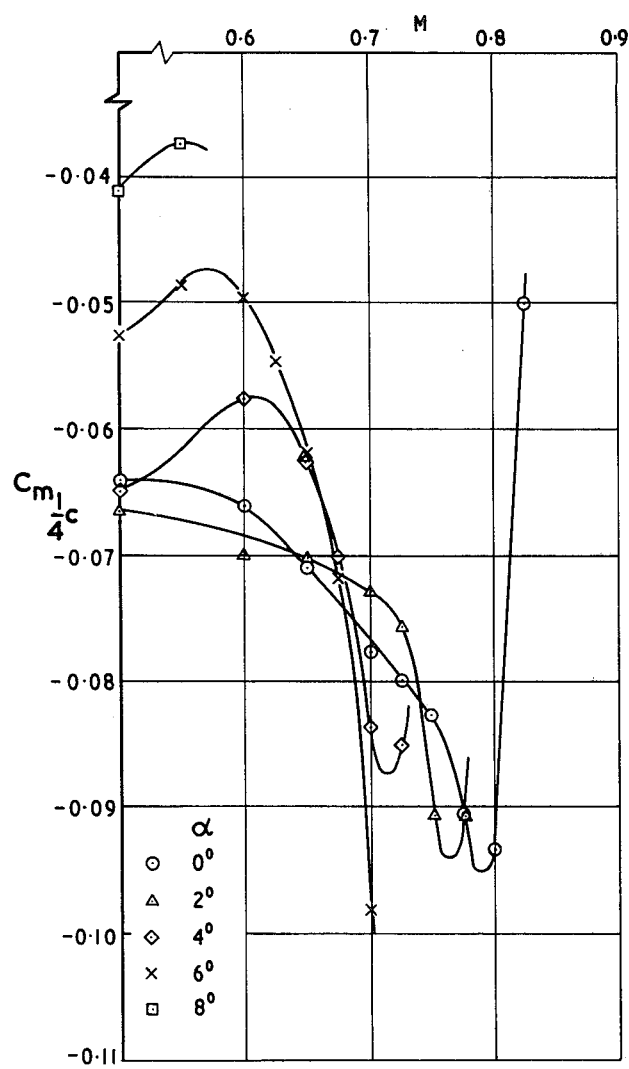
Figure 16:
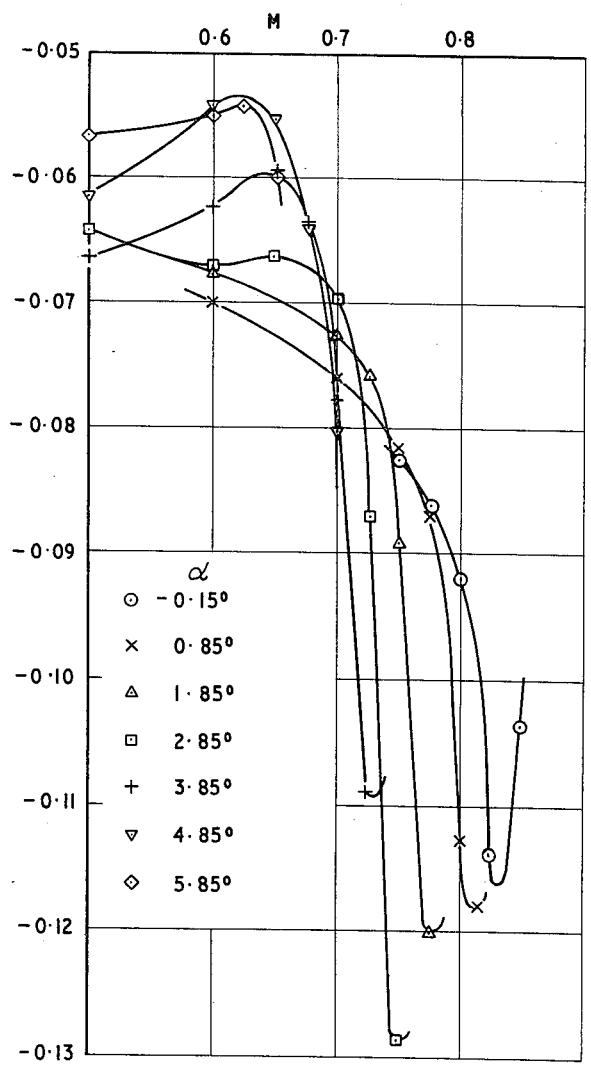

Three sections, A, B, C, in accordance with the invention will now be described by way of example with reference to the accompanying drawings, of which:

FIG. 1a compares the upper surface leading edge region shape of the sections with that of a reference section R, FIG. 1b is a graph illustrating the shape, curvature and the suction and local Mach number at certain conditions on the upper surface leading edge region of the three sections, FIG. 2 is a graph of upper surface slope in the upper surface leading edge region of the three sections, FIG. 3 is a graph of upper surface slope over the whole of sections A, B and C, FIG. 4 compares the shape of section C with a reference section R, FIG. 5 is a graph of variations of $C_L$ with $\alpha$ at subcritical Mach numbers for section C, FIGS. 6a, b, c, d, e, f, g, h, j, k are pressure distribution charts chordwise over section R for various free stream Mach numbers and angles of incidence, FIGS. 7a, b, c are pressure distribution charts chordwise over section A for various free stream Mach numbers and angles of incidence, FIGS. 8a, b, c are pressure distribution charts chordwise over section B for various free stream Mach numbers and angles of incidence, FIGS. 9a, b, c, d, e, f, g and h are pressure distribution charts chordwise over section C for various free stream Mach numbers and angles of incidence, FIG. 10 is a graph of the variation of $C_D$ with Mach number for section R, FIG. 11 is a graph of the variation of $C_D$ with Mach number for sections A to C, FIG. 12 is a graph of the variation of $C_L$ with Mach number for section R, FIG. 13 is a graph of the variation of $C_L$ with Mach number for sections A to C, FIG. 14 is a graph comparing drag rise onset of sections R and C, FIG. 15 is a graph of a variation of $C_{M_{4C}}$ with Mach number for various values of $\alpha$ for section R, FIG. 16 is a graph comparing $C_{M_{4C}}$ with Mach number for various values of $\alpha$ for section C, and FIG. 17 is a table listing the ordinates of the sections R, A, B and C.

The sections R, A, B and C are all typically supercritical, with large mean leading edge radii (2% chord), and an upper surface minimum curvature of radius of the order of 2.8 × chord (R), 3.1 × chord (A, B, C). All are concaved over a substantial portion of the rear lower surface. The reference section R has a maximum lower surface forward part radius of the order of 2.2 × chord, and a thickness of about 12% chord. The sections A, B, C have a maximum lower surface forward part radius of the order of 2.7 × chord.

By dint of a vertical scale five times that of the horizontal, the upper surface leading edge knee of sections A, B, C can be seen at $x/c = 0.05$ in FIG. 1a. The characteristics of this leading edge region are further illustrated in FIG. 2 which shows that the knee may be characterised by an approximately 3° drop in slope over about 0.003 $x/c$. Some idea of the variation of curvature in the region of the knee can be gained from FIG. 1b (which was produced by differentiation of values read from FIGS. 1a and 2). The reference section R does not have a knee.

The ordinates for all four sections R, A, B and C are listed in the table of FIG. 17, wherein $x/c$ is a distance along the chord expressed as a proportion of the chord and $Zu/c$ and $Zl/c$ are vertical distances above and below the chord respectively, also expressed as proportion of the chord. The section A has a $t/c$ ratio of 9.95%. Section B was formed with the object of reducing the magnitude of local velocity in the mid-chord region of the upper surface, by, so to speak, removing material from the upper surface mid-chord region of section A. Of the resultant blending regions, regions of increased curvature, the rearmost was kept as far to the rear as possible so as not to detract from the off design performance of the aerofoil. The forwardmost blending region was positioned at $0.05 < x/c < 0.15$ so that in the design cruise condition the extra expansion waves generated there would return to the surface as compression waves well ahead of the shock position, while in off design conditions the deleterious effects would not be acceptable. The section B has a $t/c$ ratio of 9.7%. Section C was formed with the object of further reducing the upper surface curvature and improving the drag rise Mach number at design $C_L$, by, so to speak, reducing and increasing the section B upper surface ordinates ahead of and aft of the crest respectively. To minimise the curvature at the resulting blending regions the crest position was moved rearward to about $x/c = 0.38$ (from 0.35) and a thick (0.0038 c) trailing edge was incorporated. The section has a $t/c$ ratio of 9.65%.

The variation of upper surface slope of the three sections A, B and C is illustrated in FIG. 3 which shows that the upper surface curvatures of all three sections reaches a minimum at about $x/c = 0.3$ and that this value is substantially maintained to about $x/c = 0.65$ (section A), $x/c = 0.8$ (sections B and C). The shape of section C is compared with that of section R in FIG. 4.

The effect of the knee on the pressures local to the forward upper surface of the sections A, B and C is also illustrated in FIG. 16. At the intermediate speed (M local = 0.45), a typical manoeuvre speed, the high suction peak which would have occurred over the leading edge and have led to break away and stall is curtailed and the total suction augmented, (curve Y) while at cruise conditions (M ∞ = 0.775) the positions of the sonic point and peak local Mach number have been stabilised at $x/c = 0.03$ and 0.06 respectively (curve Z).

The models were tested in a 0.46 m.x 0.20 M. wind tunnel with the models spanning the smaller dimension. The chord length of all the models was 125mm. and tests were carried out with roughness bands along the whole span of the models to give boundary layer transition ahead of the shock waves at, and near, the design conditions. For sections A, B and C the roughness band was composed of grains of carburundum sparsely distributed between 12% and 15% chord. The reference section R model had a band of the same grain size and distribution, but situated between 5% and 10% chord. As the wind tunnel operated only at atmospheric stagnation pressure the Reynolds number (R) varied from $1.5 \times 10^6$ at M = 0.5 to $2.4 \times 10^6$ at M = 0.8.

Values of lift and pitching moments were obtained from integration of the measured pressure distributions and drag was derived from a wake survey using a pitot traverse tube. No corrections were applied to the results for interference effects, but the slotted walls of the tunnel (with an open area ratio of 0.0143) were designed to minimise both blockage and incidence effects.

The subcritical speed behavior of the sections is illustrated in FIG. 5. For section B a $C_{L\,max}$ of about 1.0 was obtained at M ∞ = 0.5 to 0.65. This is an off design condition, of course, and experience of the variation of $C_L$ with M∞ and of the effect of a more realistic R suggests that $C_{L\,max}$ at take-off speeds will be higher than 1.4. However this relatively high $C_{L\,max}$ of about 1.0 is a direct result of providing the region of reduced curvature between the leading edge and the knee with a high slope and low rate of change of slope.

FIGS. 6, 7, 8 and 9 are graphs of the variation of pressure and hence Mach number local to sections R, A, B and C respectively for various free stream Mach numbers and various angles of incidence.

Section R appears to exhibit an optimum at an angle of incidence (α) equal to 1° to 2° and M∞ = 0.7 when a $C_L$ of between 0.45 and 0.6 is obtained and a $C_D$ of 0.011 to 0.012. Drag rise, due at first to the appearance of a large shock wave on the rear upper surface, then to separation, occurs at M∞ = 0.75 in these conditions. The variation of $C_L$ and $C_D$ with free stream Mach number for different angles of incidence is illustrated in FIGS. 10 and 12.

The comparison of FIGS. 7a, b with FIGS. 6a, b shows up immediately the effect of the knee on the sections according to the invention. A high local Mach number is generated at the low angles of incidence at about $x/c = 0.05$ on section A, and at $0.775 < M\infty < 0.8$ supercritical flow is substantially maintained at the high level (about 1.2) until after $x/c = 0.6$. For section A the optimum condition would appear, from FIG. 7, to lie at $0.75 < M\infty < 0.775$ with an angle of incidence $\alpha = 1°$. At M∞ = 0.775 a considerable rear shock has formed. This is confirmed by FIGS. 11 and 13, which indicate a $C_L$ of 0.37, 0.5 for $\alpha = 0.35$ and 0.85 respectively, and a $C_D$ of about 0.009. As shown in FIG. 11 drag rise is rather sharp following the optimum condition.

Figure 7B:
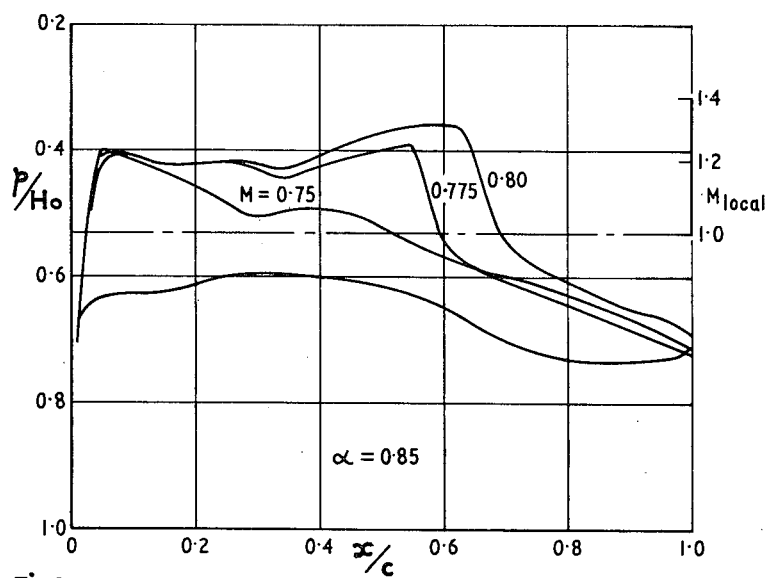
Figure 7C:
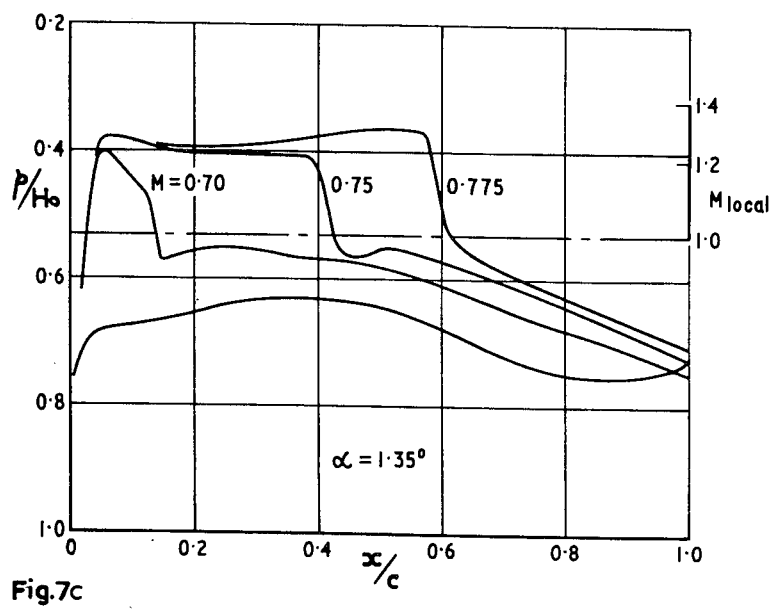

With section B the advantage of the knee at $x/c = 0.05$ is still evident (FIG. 8) and the desired effect of the flattening of the mid-chord region has substantially been achieved, namely a reduction of mid-chord local velocity, and hence in the strength of the shock wave, in return for some maintenance of the high local velocity aft of the knee (see FIG. 7). The forward blending region has given rise to double shock at M∞ = 0.775 at the low angle of incidence (FIG. 8a), but this is not widespread. For section B the optimum free stream Mach number representing the cruise condition, is higher at 0.788 than that for section A. $C_D$ at this condition is 0.009 (FIG. 11) and $C_L$ (FIG. 13) 0.4. That the drag rise does not begin until M∞ = 0.795, indicates a further advantage of section B over section A.

Section C exhibits still further reduction of mid-chord local velocity and shock strength, maintenance of the high local velocity aft of the knee, and increase in the chordwise extent of supercritical flow (to about $x/c = 0.65$) at the cruise condition (see FIGS. 9a and 8a). The double shock caused by the forward blending region is still present, but at $M\infty = 0.788$. The optimum free stream Mach number is again about 0.8. As the shock occurring at $M\infty = 0.815$ is also quite severe the section has a drag bucket at $M\infty = 0.80$, although $C_D$ is 0.012 (see FIG. 11). A $C_L$ of 0.44 is obtained (see FIG. 13).

As far as transport aircraft are concerned, the drag rise Mach number is important as this sets the limit to cruising speed. However it is equally important that there should be adequate margins between the cruise condition and separation onset. FIG. 14 compares a separation margin for sections R and C. It is found that at $C_L = 0.4$, when the section R is at $M\infty = 0.735$ and section C is at $M\infty = 0.785$, then they both have the same Mach number margin (0.025) to separation and the same $C_L$ margin (0.2) to separation. Similarly at $C_L = 0.5$ when section R is at $M\infty = 0.725$ and section C is at $M\infty = 0.775$, then they both have the same Mach number margin (0.025) and the same $C_L$ (0.02). In each case the aerofoil concerned can be said to be either at or below the drag rise Mach number, and in terms of potential cruise condition section C has a 0.05 advantage in two dimensional Mach number. Judged on this basis the advantage is somewhat less than indicated by a straight comparison of drag rise Mach numbers, because section C has a smaller margin between drag rise and separation onset than has section R. However there is still an appreciable gain coming from the new approach to design, even allowing for the expected gain from reduced thickness. Moreover it is expected that considerable improvement in drag rise margin can be obtained with section C by increasing the base (TE) thickness to say 0.01 c to permit a reduction in rear upper surface curvature.

On comparing the pitching moments for the two aerofoils (FIGS. 15 and 16) it is seen that there is much less variation of $C_m$ with $M\infty$ for section R with a corresponding reduction in the movement of the centre of pressure at constant values of $M^2C_L$. On the other hand the increase of nose down pitching moment with increase of incidence at the optimum Mach number is much less pronounced for section R, indicating a lower degree of stability.

I claim:

1. In a supercritical wing having a large leading edge radius of curvature directly followed chordwise on the upper surface by a curvature transition region and then a directly following low positive curvature region extending for 30% to 90% of the chord, and on the lower surface by a forward region of curvature generally larger than that of the upper surface low curvature region, a transition region characterised by an inflexion and occurring between 50% and 70% chord, and then a rearward region of concave curvature, the improvement comprising a knee in said upper surface curvature transition region, located at between 3% and 13% chord and extending continuously over a substantial portion of the span of the wing, said knee being characterised by a curvature which is positively greater than that immediately forward and that immediately rearward thereof, and said knee being operative to contain the peak velocity and suction at low speeds and thereby to delay the onset of stall, to minimise local supersonic expansion at intermediate speeds, and to create a region of high expansion stabilised over the knee at supercritical speeds.

2. A supercritical wing as claimed in claim 1 and wherein the knee is located at $0.05 < x/c < 0.1$.

3. A supercritical wing as claimed in claim 1 and wherein the knee is characterised by a change of slope on the order of 3° over 0.3% chord length.

* * * * *